United States Patent
Shobha et al.

(10) Patent No.: US 7,375,178 B2
(45) Date of Patent: May 20, 2008

(54) HIGH REFRACTIVE INDEX THERMOPLASTIC POLYPHOSPHONATES

(75) Inventors: Hosadurga K. Shobha, Blacksburg, VA (US); Venkat Sekharipuram, Roanoke, VA (US); James E. McGrath, Blacksburg, VA (US); Atul Bhatnagar, Roanoke, VA (US)

(73) Assignee: Essilor International (FR)

( * ) Notice: Subject to any disclaimer, the term of this patent is extended or adjusted under 35 U.S.C. 154(b) by 77 days.

(21) Appl. No.: 11/475,542

(22) Filed: Jun. 27, 2006

(65) Prior Publication Data

US 2007/0155951 A1 Jul. 5, 2007

Related U.S. Application Data

(62) Division of application No. 11/105,898, filed on Apr. 13, 2005, now Pat. No. 7,067,083, which is a division of application No. 10/642,922, filed on Aug. 18, 2003, now Pat. No. 6,943,221, which is a division of application No. 09/887,979, filed on Jun. 22, 2001, now Pat. No. 6,653,439, which is a division of application No. 09/439,825, filed on Nov. 12, 1999, now Pat. No. 6,288,210.

(51) Int. Cl.
*C08G 79/02* (2006.01)
*C08G 63/00* (2006.01)
*C08C 19/14* (2006.01)
*C08F 8/22* (2006.01)

(52) U.S. Cl. ............... 528/398; 528/176; 528/167; 525/588; 525/97; 525/210; 525/212; 351/159; 264/1.32

(58) Field of Classification Search ............. 528/398, 528/176, 167; 525/588, 97, 210, 212; 351/159; 264/1.32
See application file for complete search history.

(56) References Cited

U.S. PATENT DOCUMENTS

| 3,719,727 A | 3/1973 | Masai et al. |
| 3,946,093 A | 3/1976 | Koto et al. |
| 4,039,512 A | 8/1977 | Kim et al. |
| 4,093,582 A | 6/1978 | Mark et al. |
| 4,206,296 A | 6/1980 | Yu et al. |
| 5,679,804 A | 10/1997 | Ditrich et al. |
| 6,040,416 A | 3/2000 | Sekharipuram et al. |
| 6,288,210 B1 | 9/2001 | Shobha et al. |
| 6,653,439 B2 | 11/2003 | Shobha et al. |

FOREIGN PATENT DOCUMENTS

| JP | 51-114495 | 8/1976 |
| SU | 175651 | 10/1965 |

OTHER PUBLICATIONS

Concise Encyclopedia of Polymer Science and Engineering, p. 721, 1990.
Chemical Abstracts, 94 : 192931, Petreus et al., 1981.
Chemical Abstracts, 99 : 213370, Petreus et al., 1983.
Chemical Abstracts, 115 : 197854, Carraher et al., 1991.
Chemical Abstracts, 122: 56712, Carraher et al., 1993.
Chemical Abstracts, 84 : 60204, Koto et al., 1976.
Chemical Abstracts, 86 : 17295, Okada et al., 1977.
Chemical Abstracts, 89 : 111437, Mark et al., 1978.

*Primary Examiner*—Duc Truong
(74) *Attorney, Agent, or Firm*—Occhiuti Rohlicek & Tsao LLP

(57) ABSTRACT

High refractive index, melt processable polyphosphonates and methods for preparing the same are provided. These polymers are particularly useful for optical and ophthalmic parts, such as lenses. A method of preparing optical and ophthalmic lenses by injection molding the polymers of the present invention into the form of the optical or ophthalmic lenses is also provided.

5 Claims, No Drawings

HIGH REFRACTIVE INDEX THERMOPLASTIC POLYPHOSPHONATES

This application is a divisional of U.S. application Ser. No. 11/105,898, filed Apr. 13, 2005, now U.S. Pat. No. 7,067,083, which is a divisional of U.S. application Ser. No. 10/642,922, filed Aug. 18, 2003, now U.S. Pat. No. 6,943,221, which is a divisional of U.S. application Ser. No. 09/887,979, filed Jun. 22, 2001, now U.S. Pat. No. 6,653,439, which is a divisional of U.S. application Ser. No. 09/439,825, filed Nov. 12, 1999, now U.S. Pat. No. 6,288,210. Each of these applications are hereby incorporated by reference in their entirety.

FIELD OF THE INVENTION

The present invention is directed to melt processable, high molecular weight polyphosphonates having a high refractive index and methods of preparing the same.

BACKGROUND OF THE INVENTION

Polycarbonates are tough, rigid engineering thermoplastics. They are melt-processable and can easily be formed into optical and ophthalmic products by injection molding, instead of more time consuming and expensive casting processes. There is increasing demand for high refractive index materials for optical and opthalmic products. Polycarbonates, however, have only a limited refractive index.

Thus, there is a need for melt processable materials which have high refractive indices.

SUMMARY OF THE INVENTION

The present invention provides high molecular weight, film forming, high refractive index, melt-processable polyphosphonates. These polymers typically have lower melt processing temperatures and birefringerence than polycarbonates. These polymers may be used to form optical or ophthalmic products, such as lenses. Furthermore, the polymers of the present invention can be transferred directly from a reactor to a final mold for, for example, ophthalmic lens production, increasing the economic efficiency of the lens manufacturing process.

Another embodiment of the invention is a method of preparing the polyphosphonates of the present invention.

DETAILED DESCRIPTION OF THE INVENTION AND PREFERRED EMBODIMENTS

The present invention encompasses melt-processable phosphonate homopolymers or copolymers comprising, consisting essentially of, or consisting of units of the formula:

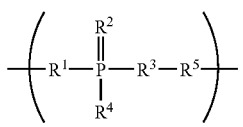

Formula I wherein $R^1$, $R^2$, and $R^3$ are independently O or S; at least one of $R^1$, $R^2$, and $R^3$ is S; $R^4$ is a linear or branched $C_1$-$C_4$ alkyl or $C_1$-$C_4$ haloalkyl, phenyl, chlorophenyl, p-tolyl, benzyl, biphenyl, or cyclohexyl; and $R^5$ is

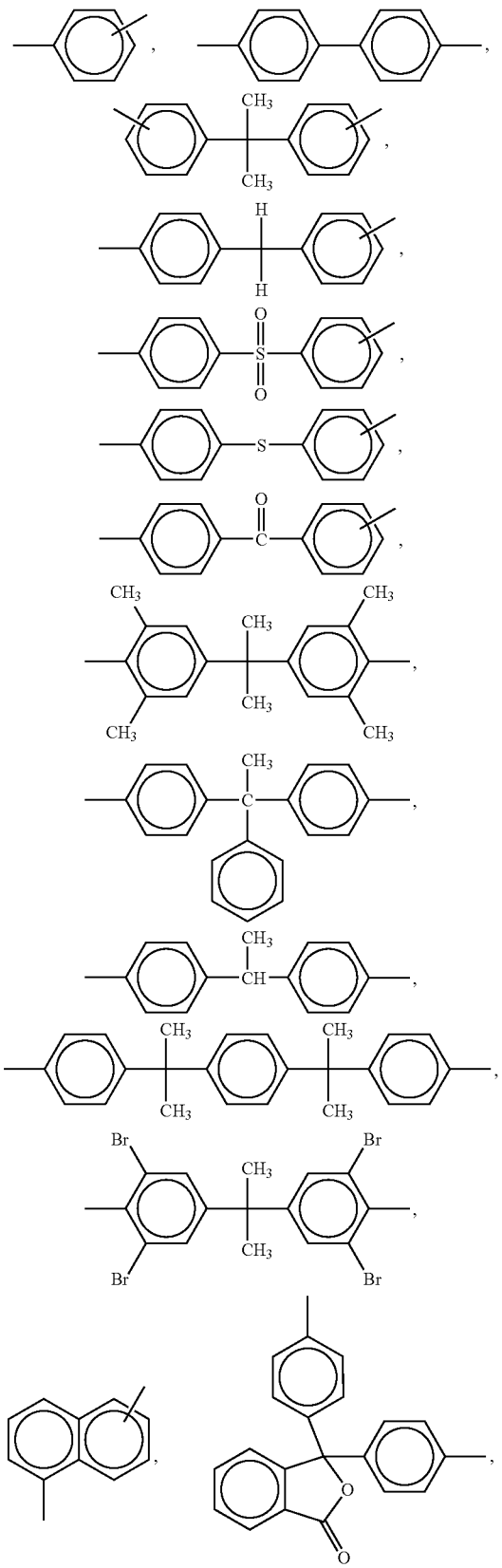

-continued

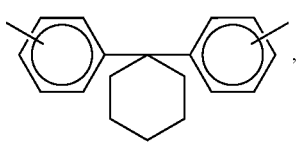

,

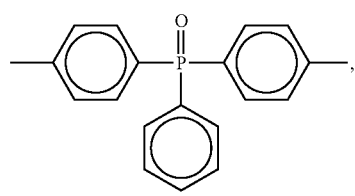

, or any combination of any of the foregoing. $R^1$ and $R^3$ are preferably O. Preferably, $R^2$ is S. Preferably, $R^4$ is phenyl. $R^5$ is preferably

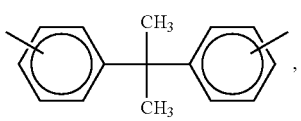

,

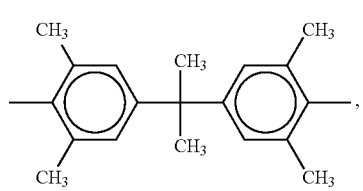

,

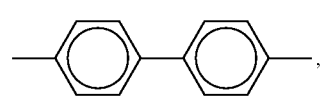

, or any combination of any of the foregoing.

Another embodiment of the present invention encompasses melt-processable phosphonate homopolymers or copolymers comprising, consisting essentially of, or consisting of units of the formula:

Formula II

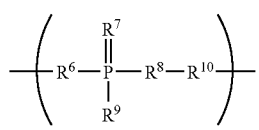

wherein $R^6$, $R^7$, and $R^8$ are independently O or S; $R^9$ is a linear or branched $C_1$-$C_4$ alkyl or $C_1$ haloalkyl, phenyl, chlorophenyl, p-tolyl, benzyl, biphenyl, or cyclohexyl; and $R^{10}$ is

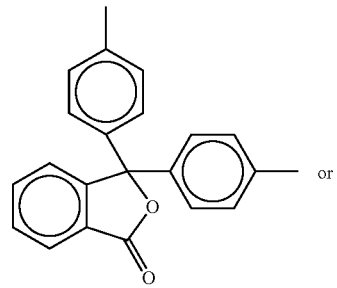

or

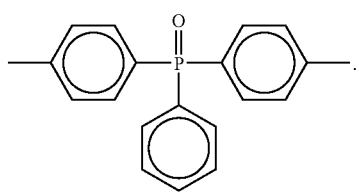

.

Preferably, $R^6$ and $R^8$ are O.

The invention further includes an optical or ophthalmic part, preferably a lens, comprising, consisting essentially of, or consisting of melt-processable phosphonate homopolymers or copolymers comprising units of the formula:

Formula III

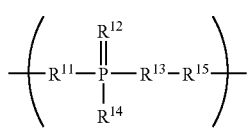

wherein $R^{11}$, $R^{12}$, and $R^{13}$ independently are O or S; $R^{14}$ is a linear or branched $C_1$-$C_4$ alkyl or $C_1$-$C_4$ haloalkyl, phenyl, chlorophenyl, p-tolyl, benzyl, biphenyl, or cyclohexyl; and $R^{15}$ is defined as $R^5$ above. The optical or ophthalmic part may also be a transparent or translucent sheet comprising the melt-processable phosphonate polymers of formula III.

The polymers of the present invention can be homopolymers or copolymers, including, but not limited to, random copolymers and block copolymers. A preferred copolymer comprises a first unit having the formula

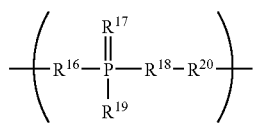

where $R^{16}$, $R^{17}$, and $R^{18}$ are independently O or S; $R^{19}$ is phenyl; and $R^{20}$ is

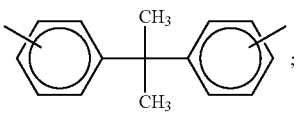

;

and a second unit having the formula

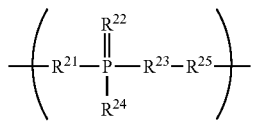

where $R^{21}$, $R^{22}$, and $R^{23}$ are independently O or S; $R^{24}$ is phenyl; and $R^{25}$ is

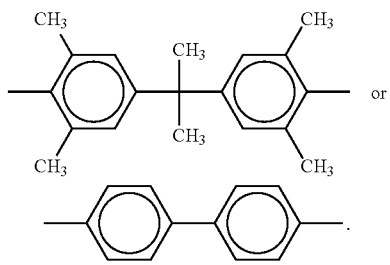

The number average molecular weight of a homopolymer or copolymer of the present invention is typically from about 10,000 to about 60,000 g/mol and preferably from about 15,000 to about 40,000 g/mol.

Generally, these homopolymers and copolymers have a glass transition temperature ($T_g$) greater than or equal to about 120° C. Also, these polymers typically have a refractive index ranging from about 1.58 to about 1.64. These polymers are typically processable at from about 75 to about 100° C. above their glass transition temperatures.

The melt-processable phosphonate homopolymers and copolymers of the present invention may be prepared as described in Japanese Patent Publication No. 61-261321. One method of preparing these polymers is as follows. At least one phosphonic acid halide having the formula

Formula IV where $R^{26}$ and $R^{28}$ are independently halogens; $R^{27}$ is O or S; and $R^{29}$ is a linear or branched $C_1$-$C_4$ alkyl or $C_1$-$C_4$ haloalkyl, phenyl, chlorophenyl, p-tolyl, benzyl, biphenyl, or cyclohexyl is reacted with one or more bisphenols to yield the phosphonate homopolymer or copolymer. Preferred phosphonic acid halides include phenyl phosphonic dichloride, phenyl thiophosphonic dichloride, and any combination of any of the foregoing. The phosphonic acid halide may be dissolved by mixing it in a solvent, such as methylene chloride, prior to reacting the phosphonic acid halide with the bisphenol. When preparing polymers having units of the formula I or II above, $R^{27}$ and $R^{29}$ of the phosphonic acid halide are defined as $R^2$ and $R^4$ or $R^7$ and $R^9$ above, respectively.

Suitable bisphenols include, but are not limited to, hydroquinone; resorcinol; 4,4'-dihydroxybiphenyl; 4,4'-cyclohexylidenediphenol; bisphenol A; bis(4-hydroxyphenyl) methane; 2,2-bis(2-hydroxyphenyl)propane; bis P; 4,4'-bis-S; 2,2'-bis-S; 2-hydroxyphenyl-4'-hydroxyphenyl sulfone; dihydroxydiphenyl ether; bis(4-hydroxyphenyl) sulfide; bis (2-hydroxyphenyl) sulfide; dihydroxybenzophenone; 1,5-dihydroxynaphthalene; 2,5-dihydroxynaphthalene; 2,2-bis (3,5-dimethyl-4-hydroxyphenyl) propane; thiodithiophenol; phenolphthalein; 4,4'-bis(hydroxyphenyl)phenyl phosphine oxide; α,α'-bis(4-hydroxy-3-methylphenyl)-1,4-diisopropylbenzene; bis E; 2,2-bis(4-hydroxy-3-methylphenyl) propane; bis(4-hydroxy-3-methylphenyl) sulfide; dihydroxydiphenylether; 1,3-bis(4-hydroxyphenoxy) benzene; phenyl HC; t-butyl HQ; 4,4'-thiobis(t-butyl cresol); 2,2'-thiobis(4-t-octylphenol); and any combination of any of the foregoing. The bisphenol may be dissolved by mixing it in a solvent, such as methylene chloride with triethylamine and 1-methyl imidazole, prior to reacting the bisphenol with the phosphonic acid halide.

The copolymer of the present invention may be prepared by reacting at least two different phosphonic acid halides having the aforementioned formula with one or more bisphenols. Alternatively, the copolymer may be prepared by reacting at least one phosphonic acid halide with at least two different bisphenols.

Optical or ophthalmic lenses may be prepared by injection or compression molding a melt-processable phosphonate polymer of the present invention into the form of a lens.

The following examples illustrate the invention without limitation.

EXAMPLE 1

A 4-necked, 500 mL round bottomed flask equipped with an overhead stirrer, nitrogen inlet, temperature probe, dropping funnel and a condenser, was flame dried three times and cooled to room temperature each time under a strong purge of dry nitrogen. 20.546 g (0.09 moles) of bisphenol A, 120 mL of dry distilled methylene chloride, 27.5 mL (0.198 moles) of dry distilled triethylamine (10% excess), and 0.24 mL (0.003 moles) of 1-methyl imidazole was added to the flask. The mixture was stirred until the bisphenol A was completely dissolved. The flask was cooled to about 0° C. with stirring. A solution of 17.549 g (0.09 moles) of distilled phenylphosphonic acid dichloride in 60 mL of dry methylene chloride was added dropwise from a dropping funnel over about 40-60 minutes while the flask was maintained at about 0° C. and the mixture was stirred. After completion of the dropwise addition, stirring was continued for another hour. A solution of 1.367 g (0.00091 moles) t-butylphenol in 15 mL of methylene chloride was added to the mixture and the mixture was stirred for 30 minutes. The mixture was washed with 0.5 N aqueous hydrochloric acid and then repeatedly washed with water until the aqueous phase was neutral. The mixture was poured into rapidly stirred methanol and allowed to coagulate. The polymer was dried and dissolved in about 15-20% w/v tetrahydrofuran (THF) and allowed to coagulate in the water to form a free flowing fibrous polymer. The polymer was dried in a vacuum oven at about 90-95° C. This polymer comprised units having the formula

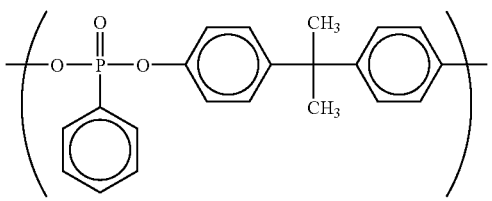

EXAMPLES 2-5

The procedure in Example 1 was repeated except bis P, 4,4'-biphenol, 4,4'-cyclohexylidenediphenol, or phenolphthalein was substituted for bisphenol A in Examples 2-5, respectively. The polymers prepared comprised units having the formulas in Table 1 below.

TABLE 1

| Example | Units |
|---|---|
| 2 | (structure) |
| 3 | (structure) |
| 4 | (structure) |
| 5 | (structure) |

EXAMPLE 6

Tough, ductile films and plaques were formed from the polymers prepared in Examples 1-5 by compression molding and their refractive index, number average molecular weight ($M_n$), and glass transition temperature ($T_g$) were determined. The results are shown in Table 2 below.

TABLE 2

| Example | Refractive Index Value | $M_n$ | $T_g$ (° C.) |
|---|---|---|---|
| 1 | 1.60 | 44,000 | 117 |
| 2 | 1.60 | 33,000 | 124 |
| 3 | 1.639 | 21,500 | 145 |
| 4 | 1.606 | 19,100 | 130 |
| 5 | 1.623 | 26,000 | 186 |

The tensile properties of the polymer prepared in Example 1 were determined and are shown in Table 3 below.

TABLE 3

| Modulus (GPa) | Yield Stress (MPa) | Yield Strain (%) | Stress at Break (MPa) | Strain at Break (%) |
|---|---|---|---|---|
| 1.30 ± 0.1 | 67.5 ± 3.2 | 9.3 ± 0.5 | 45.5 ± 3.4 | 54.2 ± 20.0 |

EXAMPLE 7

A first solution of phenyl thiophosphonic dichloride in methylene chloride was added dropwise over about 1 hour to a second solution of bisphenol A, triethylamine, and N-methyl imidazole, while the second solution was maintained at about 0° C. and stirred. After completion of the dropwise addition, the solution was warmed to room temperature and stirred for about 10 hours. The mixture was then washed with water. The mixture was poured into rapidly stirred methanol and allowed to coagulate to form a polymer. The polymer was dried and dissolved in about 15-20% w/v tetrahydrofuran (THF) and allowed to coagulate in the water to form a free flowing fibrous polymer. The polymer was dried in a vacuum oven at about 90-95° C. This polymer comprised units having the formula

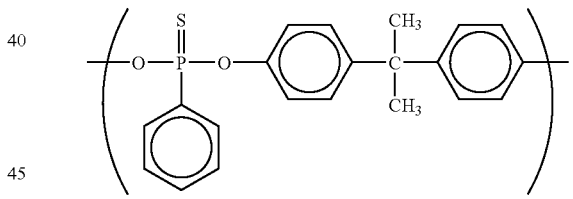

The refractive index, number average molecular weight ($M_n$), weight average molecular weight ($M_w$), and polydisperity index ($P_d$) of the polymer were determined. The results are shown in Table 4 below.

TABLE 4

| Refractive Index | $M_n$ | $M_w$ | $P_d$ |
|---|---|---|---|
| 1.629 | 29,000 | 59,000 | 2.01 |

All patents, publications, applications, and test methods mentioned above are hereby incorporated by reference. Many variations of the present matter will suggest themselves to those skilled in the art in light of the above detailed description. All such obvious variations are within the patented scope of the appended claims.

What is claimed is:

1. A method for preparing a phosphonate homopolymer or copolymer, said method comprising reacting (a) at least one phosphonic acid halide having the formula

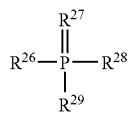

wherein $R^{26}$ and $R^{28}$ are independently halogens; $R^{27}$ is S; and $R^{29}$ is a linear or branched $C_1$-$C_4$ alkyl or $C_1$-$C_4$ haloalkyl, phenyl, chlorophenyl, p-tolyl, benzyl, biphenyl, or cyclohexyl; with (b) a bisphenol selected from the group consisting of hydroquinone, resorcinol, 4,4'-dihydroxybiphenyl, 4,4'-cyclohexylidene diphenol, bisphenol A, bis(4-hydroxyphenyl)methane, 2,2-bis(2-hydroxyphenyl)propane, bis P, 4,4'-bis-S, 2,2'bis-S, 2-hydroxyphenyl-4'hydroxyphenyl sulfone, dihydroxydiphenyl ether, bis (4-hydroxyphenyl)sulfide, bis(2-hydroxyphenyl) sulfide, dihydroxybenzophenone, 1,5-hydroxynaphthalene, 2,5-dihydroxynaphthalene, 2,2-bis(3,5-dimethyl-4-hydroxyphenyl) propane, thiodithiophenol, phenolphthalein, 4,4'-bis(hydroxyphenyl)phenylphosphine oxide, α,α'-bis(4-hydroxy-3-methylphenyl)-1,4diisopropylbenzene, bis E, 2,2-bis (4-hydroxy-3-methylphenyl)propane, bis(4-hydroxy-3-methylphenyl)sulfide, dihydroxydiphenylether, 1,3-bis (4-hydroxyphenoxy) benzene, phenyl HC, t-butyl HQ, 4,4'-thiobis(t-butyl cresol), 2,2'-thiobis(4-t-octylphenol), and any combination of any of the foregoing to yield said homopolymer or copolymer.

2. A method for preparing a phosphonate homopolymer as defined in claim 1, wherein said phosphonic acid halide is selected from the group consisting of phenyl phosphonic dichloride, phenyl thiophosphonic dichloride, and any combination if any of the foregoing, and said bisphenol is bisphenol A.

3. A method for preparing a phosphonate homopolymer or copolymer, said method comprising reacting (a) at least one phosphonic acid halide having the formula

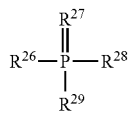

wherein $R^{26}$ and $R^{28}$ are independently halogens; $R^{27}$ is O; and $R^{29}$ is a linear or branched $C_1$-$C_4$ alkyl or $C_1$-$C_4$ haloalkyl, phenyl, chlorophenyl, p-tolyl, benzyl, biphenyl, or cyclohexyl; with (b) phenolphthalein or 4,4'-bis(hydroxyphenyl)phenyl phosphine oxide to yield said homopolymer or copolymer.

4. A phosphonate homopolymer or copolymer prepared by the method as defined in claim 1.

5. A phosphonate homopolymer or copolymer prepared by the method as described in claim 3.

* * * * *

UNITED STATES PATENT AND TRADEMARK OFFICE
CERTIFICATE OF CORRECTION

| | | |
|---|---|---|
| PATENT NO. | : 7,375,178 B2 | Page 1 of 1 |
| APPLICATION NO. | : 11/475542 | |
| DATED | : May 20, 2008 | |
| INVENTOR(S) | : Hosadurga K. Shobha | |

It is certified that error appears in the above-identified patent and that said Letters Patent is hereby corrected as shown below:

Title Page; item (73);
On Page 1, please add Assignee --Virginia Tech Intellectual Properties, Inc., Blacksburg, Virginia--.

Signed and Sealed this

Second Day of December, 2008

JON W. DUDAS
*Director of the United States Patent and Trademark Office*